United States Patent [19]

LeKuch et al.

[11] Patent Number: 4,934,650
[45] Date of Patent: Jun. 19, 1990

[54] PIPE SUPPORT DEVICE

[75] Inventors: Herbert W. LeKuch, New York, N.Y.; Nicholas J. Lucia, Jr., West Caldwell, N.J.

[73] Assignee: Vibration Mountings & Controls, Inc., Bloomingdale, N.J.

[21] Appl. No.: 383,115

[22] Filed: Jul. 21, 1989

[51] Int. Cl.⁵ .............................................. F16L 3/00
[52] U.S. Cl. ...................................... 248/613; 248/60; 267/141
[58] Field of Search .................... 248/610, 613, 60, 59, 248/324, 327, 68.1, 343; 267/141, 153

[56] References Cited

U.S. PATENT DOCUMENTS

| | | | |
|---|---|---|---|
| 2,308,969 | 1/1943 | Riesing | 248/613 |
| 2,389,562 | 11/1945 | Storch | 248/613 |
| 3,223,400 | 12/1965 | Deister | 248/613 |
| 3,843,080 | 10/1974 | Imai | 248/59 |
| 3,960,350 | 6/1976 | Tardoskegyi | 248/68.1 |
| 4,083,522 | 4/1978 | Vandersip | 248/613 |
| 4,634,088 | 1/1987 | Schad | 248/613 |
| 4,681,294 | 7/1987 | Soltysiak | 248/613 |

FOREIGN PATENT DOCUMENTS

| | | | |
|---|---|---|---|
| 956620 | 10/1974 | Canada | 248/59 |
| 3029588 | 3/1982 | Fed. Rep. of Germany | 248/60 |
| 26167 | 12/1905 | United Kingdom | 267/141 |
| 2127126 | 4/1984 | United Kingdom | 248/60 |

Primary Examiner—Blair M. Johnson
Assistant Examiner—Robert A. Olson
Attorney, Agent, or Firm—Wolder, Gross & Bondell

[57] ABSTRACT

A support unit for suspending a pipe or similar article from an overhead structure comprises a frame having a base and a pair of opposed sides. The base has an opening therein to accommodate a vertically-oriented hanger-rod means extending downwardly therethrough for support of the pipe. A resilient element having a lower peripheral shoulder is mounted within the frame and is adapted to support the hanger-rod. A retention clip is provided with a generally circular central portion adapted to embrace the resilient element above said shoulder and a pair of opposed ears extending horizontally outward from said central portion, the frame having a pair of opposed slots dimensioned to accept the ears and retain the clip and the embraced resilient element in position.

3 Claims, 2 Drawing Sheets

PIPE SUPPORT DEVICE

The present invention relates to a new and improved vibration damping apparatus and, in particular, to a device intended to be utilized in connection with the support of pipes and other elements, such as conduits, from overhead structural elements.

BACKGROUND OF THE INVENTION

The construction trades typically utilize a variety of support devices and structures to mount and suspend pipes, conduits, raceways, electrical panels, food units, air conditioners and similar elements from support structures. Often the suspended elements are in the form of relatively long spans of rigid materials, such as soldered or welded pipe sections, and thus such elements must be insulated from vibrations arising in the main structure from which they are supported. Conversely, the supported elements themselves may be the source of vibration, and such vibrations similarly should be prevented from being transferred to the supporting structure.

A typical support unit of the prior art incorporates a ring or platform to embrace the pipes or other elements to be supported, the ring or platform being itself supported by vertically-extending down-rods. The down-rods are mounted in a resilient puck 10 having a molded neck 14 in its bottom surface adapted to engage with a properly-sized bore in the bottom 16 of a support framework 12. Such inserts are difficult to install and remove. In addition, the existence of the neck provides an area at which stress is concentrated during flexure of the insert, and often results in premature failure of the insert at that point.

BRIEF DESCRIPTION OF THE INVENTION

To overcome the above and other shortcomings of the prior art, the support unit of the present invention utilizes a resilient unit which sits upon the base of a support frame. The unit is maintained in position within the frame by a retention clip having a central section adapted to embrace the resilient element and a pair of opposed ears which extend through and are retained by a pair of opposed slits on the frame walls. The retention clip may be formed of a unitary section of wire, the ends of the wire being formed into a pair of opposed grasping elements, the engagement of which permits the ears to be disengaged from the slots, thus freeing the resilient element and allowing it to be easily removed and replaced.

BRIEF DESCRIPTION OF THE DRAWINGS

A fuller understanding of the present invention and the objects and features thereof will be accomplished upon consideration of the following description of a preferred, but nonetheless illustrative embodiment thereof when reviewed in conjunction with the annexed drawings, wherein.

DETAILED DESCRIPTION OF A PREFERRED EMBODIMENT

Figure 4:
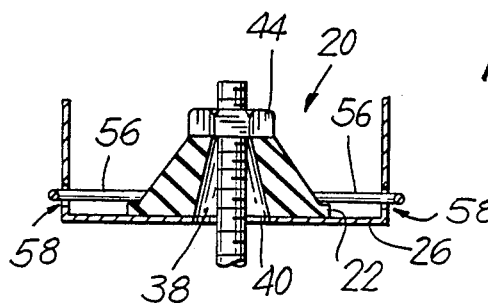
FIG. 4 is a side elevation view, in section, taken along line 4—4 of FIG. 3.
Figure 2:
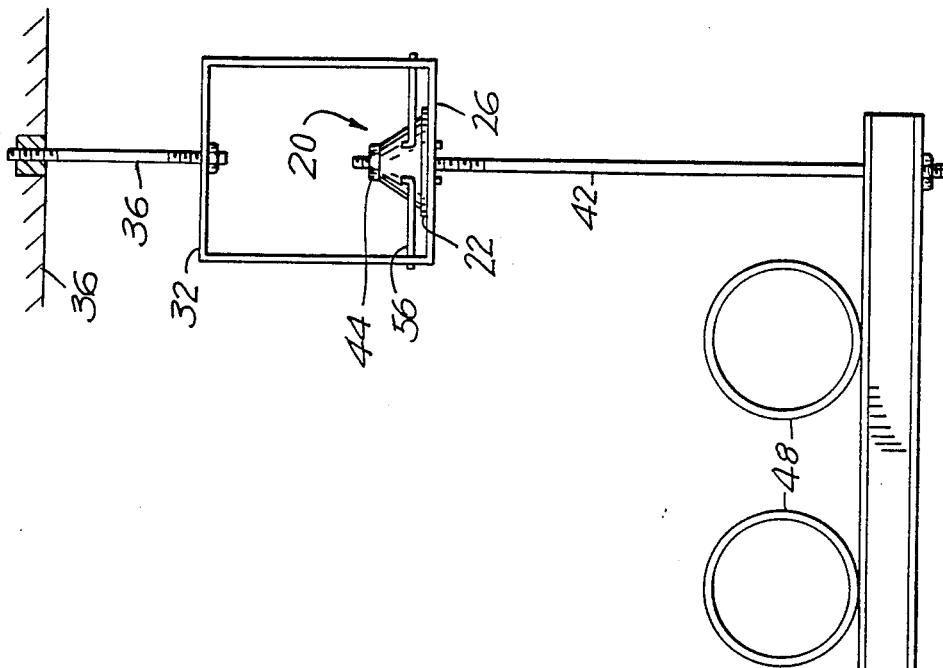
FIG. 2 is a side elevation view of the present invention supporting a series of pipe elements.
Figure 2:
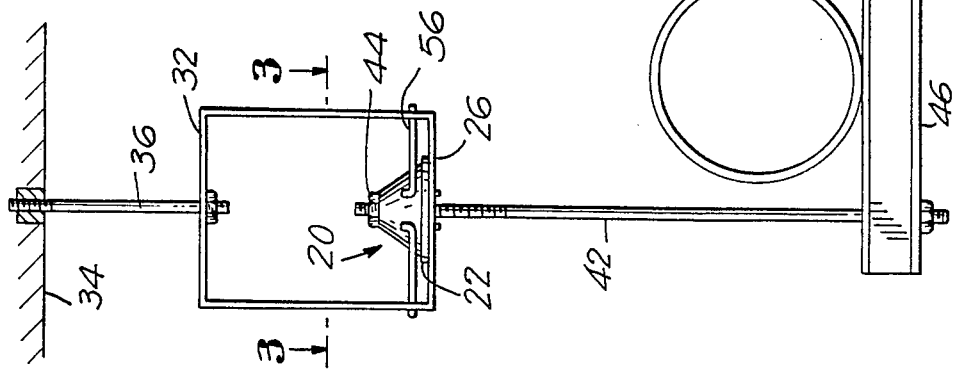

As may be seen in FIG. 4, resilient element 20, which may be tapered, is provided with throughbore 38, which also may be tapered as shown to more readily accept relative motion of down-rod 42, the lower end of the throughbore being aligned with throughbore 40 in frame base 26. As seen in FIG. 2, which depicts a representative support system utilizing the present invention, a pair of down-rods 42 are each suspended from the top of a resilient element 20 by a threaded nut 44, the down-rod being affixed to support platform channel member 46 by which the pipes 48 are supported. The support frames 24 in which the element 20 are mounted are themselves supported from the ceiling 34 by hanger rods 36.

Figure 1:
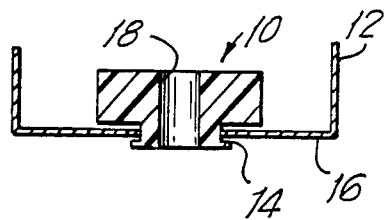
FIG. 1 is an elevation view, in section, of a typical prior art hanger.
Figure 3:
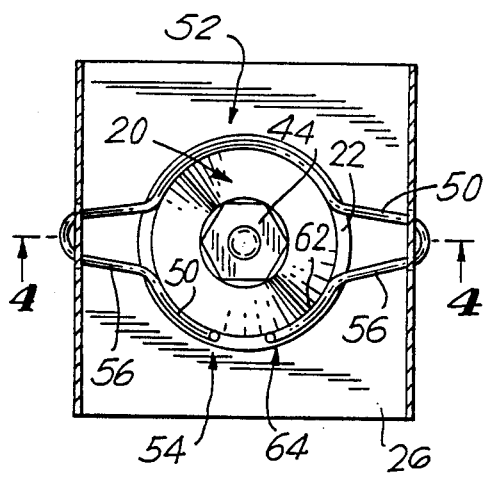
FIG. 3 is a top plan view, in section, taken along line 3—3 of FIG. 2.

As seen in FIG. 3, resilient element 20 is maintained within the support frame 24 by retention clip 50, advantageously formed of a continuous section of steel wire or the like. The retention clip 50 includes a generally circular, central portion defined by first and second opposed arcuate sections 52, 54 adapted to embrace the resilient element 20 above the shoulder 22, and a pair of opposed, outwardly-extending ear portions 56 extending from and joining the arcuate regions. As seen in FIG. 4, the opposed sides 28, 30 of the frame are each provided with a horizontally-extending slot 58 adapted to accept the ends of the ears 56. The height of the slots 58 above the base 16 of the frame is such that the shoulder 22 of the resilient element is placed under minor compression, thus assisting in maintaining the resilient element in position and maintaining the ears 56 within the slots 58.

Second arcuate section 54 may be formed from the opposed spaced ends of the wire segment from which the clip is formed, and may comprise portions 60 and 62 terminating in opposed, upwardly-directed arms 64 formed at the ends of the wire. The arms 64 may be grasped and compressed together by use of an appropriate tool, such as a pair of pliers. Pliers having a pair of pivoting nose pieces can be used to access the arms when the position of the support device does not permit access with a straight-section tool. The compressions of the arms together foreshortens the effective length of the clip, drawing the ends of ears 56 inwardly beyond the frame walls, thus permitting removal of the clip, freeing the resilient element for replacement.

We claim:

1. A support unit for suspending a pipe or similar article from an overhead structure, comprising a frame having a base and a pair of opposed sides, said base having an opening therein to accommodate a vertically-oriented hanger-rod means extending downwardly therethrough for support of a pipe or similar element; a resilient element mounted within said frame and having a base adapted to sit upon said base, said resilient element further including a body extending upwardly from a peripheral shoulder at said base, said body having opposed top and bottom surfaces with a throughbore therebetween adapted to accept said hanger-rod, said hanger-rod being supported by said top surface; and a retention clip having a generally circular central portion adapted to embrace said resilient element above said shoulder and a pair of opposed ears extending horizontally outward from said central portion, said frame having a pair of opposed slots on the sides thereof dimensioned to accept said ears to retain said clip and the embraced resilient element therein.

2. The apparatus of claim 1, wherein said clip is formed of an integral piece of wire-like material, said central portion comprising a pair of opposed arcuate sections, one of said sections being formed from the opposed ends of said wire-like material.

3. The apparatus of claim 2, wherein said section formed from the opposed ends of said wire-like material includes a pair of spaced, generally upwardly-directed arms formed from said opposed ends, said clip being dimensioned to be retractable from said slots upon compression together of said arms to allow said clip to be inserted and removed from said frame.

* * * * *